Sept. 21, 1926.
A. C. PATCH
1,600,485
SECTIONAL MUD CHAIN
Filed May 22, 1926
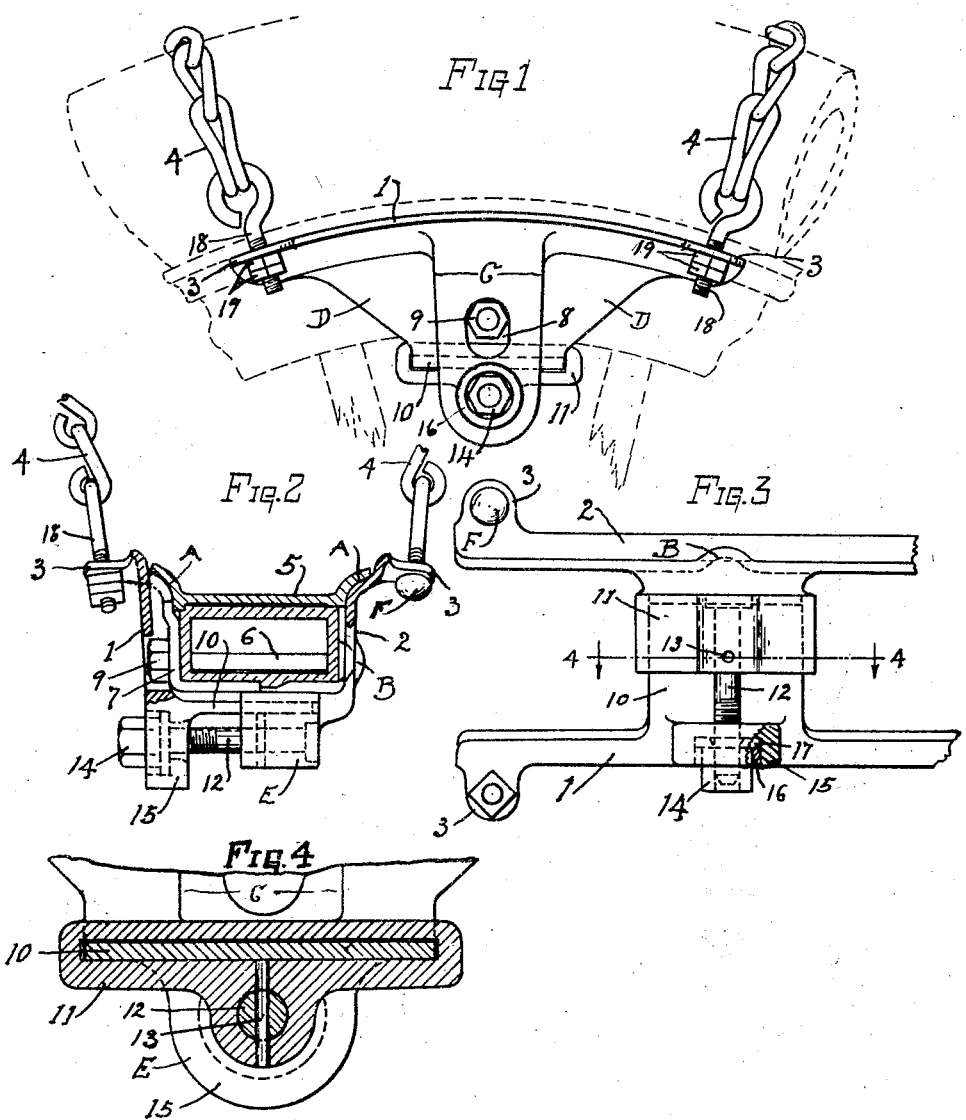
INVENTOR.
ALBERT C. PATCH
BY
U. G. Charles
ATTORNEY.

Patented Sept. 21, 1926.

1,600,485

UNITED STATES PATENT OFFICE.

ALBERT C. PATCH, OF TOPEKA, KANSAS.

SECTIONAL MUD CHAIN.

Application filed May 22, 1926. Serial No. 110,974.

My invention relates to mud chains and has for its chief objects—

First: to provide a sectional unit to engage on the rim lug and bolt to prevent marring the finish on the felloe or spokes.

Second: to provide a sectional mud chain that when the wheel is mired the sections can be placed on, one at a time, working on the top portions of the wheel, that is to say when one section is placed, rotate the wheel so that other sections may be placed thereon above the mire.

Third: to provide a sectional mud chain such that the chain supporting member will engage on the rim of the wheel simultaneously with the lug and bolt.

Fourth: to provide an adjustment for the chain supporting members to accommodate felloes of different widths; these and other objects will hereinafter be more fully explained.

Referring to the drawings:

Fig. 1 is a side view of the mechanism, a fragmentary portion of the wheel and tire shown by dotted lines.

Fig. 2 is a transverse view of Fig. 1, the felloe and rim being in cross section, parts being removed from the mud chain mechanism for convenience of illustration.

Fig. 3 is a plan view of the device, parts being removed for lack of space on the drawing sheet.

Fig. 4 is an enlarged cross section taken on line 4—4 looking in the direction of the arrow.

The mud chain herein disclosed consists of two sectional members, 1 being the outside and 2 the inside; the said members having laterally extending ears 3 on each end thereof, the said ears having apertures adapted to receive the connecting means of the chains 4, the said members being segmental to engage on the flanges of the rim 5 as at A; at which points the tension of the chains have their resistance simultaneously with the engagement on the rim bolt 6 and the lug 7.

The member 2 has a socket as at B to receive the head of the bolt while the member 1 is pressed outward as shown at C to engage snugly over the rim lug; but the depression is not sufficient to allow the webs D to contact with the felloe.

An elongated aperture 8 is provided in the last said member to engage over the nut 9 of the rim bolt. It is now readily seen how the members 1 and 2 engaging on the bolt head and rim lug are prevented from sliding longitudinally on the felloe. The said members are adapted to slidably engage with each other on the inside of the felloe, that is to say the member 1 has a tongue 10 adapted to enter the slot of a lug 11 which passes therethrough, the said lug being integral with member 2. Concentrically positioned on the outside of the lug is a protrusion E having an aperture therethrough to receive a bolt 12 which is rigidly attached therein by a pin 13, the said bolt being threaded is adapted to engage with a nut 14 which is rotatably mounted in a lug 15. The said lug being integral with the member 1; it is now readily seen how members 1 and 2 are clamped firmly engaging on the rim bolt and lug and simultaneously engaging with the flanges of the rim.

As a convenient means to retain the nut 14 in the lug 15, I have provided a washer 16 snugly engaging in the lug in close contact with a flange 17 which is integral with the nut, which provision allows a free rotation of the nut engaging with the bolt and also a possible removal of the nut by driving it out simultaneously with the washer.

As adjusting means for the chains 4, I have provided bolts 18 having eyes to receive the ends of the chains 4, the said bolts being threaded and of sufficient length to accommodate for oversized tires, or other minor variations; as a convenient means I have placed two nuts 19 on each of the bolts functioning as locking means when properly adjusted. The opposite ends of the chains are securely attached to the ears of the member 2 by placing a head F on the end of a similar bolt having an eye as described for the opposite ends of the chain.

Such modifications may be employed as lie within the scope of the appended claims.

Having thus described my invention, what I claim as new and desire to secure by Letters Patent is:—

1. In a sectional mud chain, in combination with a rim lug and bolt and the rim of an automobile wheel, a pair of members to engage on opposite sides of the felloe of the wheel having depressions for rigid bearing on the rim lug and bolt, respectively; arcuated edges on said members to engage snugly on the rim of the wheel, laterally extending portions of said members slidably engaging with each other across the inner edge of the felloe of the wheel, a bolt paralleling said portions as adjusting means to bind said members firmly to their said bearing points, chains extending over the tire and connecting with the arcuated edges, all as and for the purpose described.

2. In a sectional mud chain, a member having a depression to engage on the rim lug of the wheel, an aperture in the depression to receive the nut of the rim lug, an arcuated edge for the member, perforated ears at both ends of the arcuated edge, a member on the opposite side of the wheel similar in contour to first said member, a socket in said member to engage on the head of the rim bolt, laterally extending members integral with their respective members having means to support both of the first said members parallel to each other and adjusting means causing both said members to move to and from each other, chains connecting first said members so that the arcuated portions thereof will engage snugly with the rim of the wheel.

3. In a sectional mud chain, in combination with an automobile wheel, a pair of members being arcuated on one of their edges and having laterally extending members on the opposite edges to engage with each other across the felloe of the wheel, said members being carried by the rim bolt and lug of the wheel to prevent their contact with the felloe, adjusting means to bind said members to the rim lug and bolt, means on said lateral members for sliding engagement supporting the first said members parallel to each other, chains connecting the arcuated edges of first said members, said chains circumscribing the tire of the wheel.

ALBERT C. PATCH.